(12) United States Patent
Gans et al.

(10) Patent No.: US 9,802,369 B2
(45) Date of Patent: Oct. 31, 2017

(54) EPOXY CORE WITH EXPANDABLE MICROSPHERES

(75) Inventors: Adam Gans, Prevost (CA); Jerome Le Corvec, Ottawa (CA)

(73) Assignee: Bauer Hockey, LLC, Exeter, NH (US)

( * ) Notice: Subject to any disclaimer, the term of this patent is extended or adjusted under 35 U.S.C. 154(b) by 1241 days.

(21) Appl. No.: 12/048,941

(22) Filed: Mar. 14, 2008

(65) Prior Publication Data
US 2009/0233053 A1 Sep. 17, 2009

(51) Int. Cl.
*B29C 70/44* (2006.01)
*B29C 44/02* (2006.01)
(Continued)

(52) U.S. Cl.
CPC .............. *B29C 70/44* (2013.01); *A63B 59/70* (2015.10); *B29C 44/02* (2013.01); *B29C 44/08* (2013.01);
(Continued)

(58) Field of Classification Search
CPC B29K 2105/04; B29K 2105/06; A63B 59/14; A63B 2209/00; A63B 2209/02; B29C 70/086; B29C 70/342; B29C 70/78; B29C 70/865; B29C 70/24; B29C 44/08; B29C 70/66; B29C 70/44; B29L 2031/52; B32B 5/22; B32B 5/02; B32B 2260/021; B32B 2262/0253; B32B 2262/0261; B32B 2262/0269; B32B 2262/101; B32B 2262/106; B32B 2262/14; B32B 2264/02; B32B 2264/10; B32B 2307/56; B32B 2571/02; B32B 2605/00; B32B 2605/18;
(Continued)

(56) References Cited

U.S. PATENT DOCUMENTS 3,615,972 A * 10/1971 Morehouse et al. ............ 156/79
3,934,875 A 1/1976 Easton et al.
(Continued)

FOREIGN PATENT DOCUMENTS

CA 2365484 6/2003
FR 2638368 5/1990
(Continued)

OTHER PUBLICATIONS

European Search Report for Application No. EP10013732.2-1253, dated Jan. 11, 2011, 7 pages.
(Continued)

*Primary Examiner* — Alicia Chevalier
(74) *Attorney, Agent, or Firm* — Banner & Witcoff, Ltd.

(57) ABSTRACT

A method of fabricating a formed structure with expandable polymeric shell microspheres. A first plurality of polymeric shell microspheres are heated from an unexpanded state to an expanded state to form a plurality of expanded microspheres. The plurality of expanded microspheres are mixed with an epoxy resin and a second plurality of unexpanded polymeric shell microspheres. The mixture is formed in a shape to create a preform. The preform is wrapped with fiber tape to create a wrapped preform. The wrapped preform is placed in a mold. The mold is heated and the second plurality of unexpanded microspheres expand from an unexpanded state to an expanded state. The mold is cooled and the formed structure is removed from the mold.

8 Claims, 3 Drawing Sheets

(51) Int. Cl.

| | | |
|---|---|---|
| *B29C 70/02* | (2006.01) | |
| *A63B 59/70* | (2015.01) | |
| *B29C 70/86* | (2006.01) | |
| *B29C 70/08* | (2006.01) | |
| *B29C 70/66* | (2006.01) | |
| *B29C 44/08* | (2006.01) | |
| *A63B 102/24* | (2015.01) | |
| *B29K 105/04* | (2006.01) | |
| *B29K 105/06* | (2006.01) | |
| *B29L 31/52* | (2006.01) | |

(52) U.S. Cl.
CPC .......... *B29C 70/021* (2013.01); *B29C 70/086* (2013.01); *B29C 70/66* (2013.01); *B29C 70/865* (2013.01); *A63B 2102/24* (2015.10); *A63B 2209/00* (2013.01); *A63B 2209/02* (2013.01); *B29K 2105/04* (2013.01); *B29K 2105/06* (2013.01); *B29L 2031/52* (2013.01); *Y10T 428/24777* (2015.01)

(58) Field of Classification Search
CPC .. B32B 23/02; B32B 5/18; B32B 1/04; B32B 1/08; B32B 27/32; B32B 27/36; B32B 3/12; B32B 3/26; B32B 5/26; B32B 3/30; B32B 1/46; B32B 13/22; B23P 25/00; B23P 17/00; B22D 11/128; B22D 11/126; C04B 14/04; C08K 3/34; C08K 5/01; C08K 5/1345; C08K 5/375; C08K 5/13; C08K 5/14; C08K 3/22; C09C 1/02; C09C 1/44; D04H 13/00; F41H 5/007; F41H 5/0485; F16F 9/30; H01B 3/441; H01B 7/2813; C08L 23/06; C08L 71/02; C08L 2203/202; C08L 2312/00; Y10T 428/2933; C08J 9/32; C08J 2363/00; C08J 9/00; B21B 1/46; B21B 13/22
USPC ............. 428/116, 117, 316.6, 119, 213, 215, 428/318.6, 319.3, 319.7, 473.5, 195, 192, 428/34.1, 123, 304.4, 426, 480, 500, 76, 428/143, 172, 375; 264/258, 136, 137; 473/560, 561, 562, 563, 305, 306, 307, 473/308, 309, 313, 314; 523/400, 173; 521/50, 56, 60; 442/239, 318, 327, 381, 442/59
See application file for complete search history.

(56) References Cited

U.S. PATENT DOCUMENTS

| | | | |
|---|---|---|---|
| 4,025,686 A * | 5/1977 | Zion | 442/373 |
| 4,061,520 A | 12/1977 | Cecka et al. | |
| 4,312,912 A | 1/1982 | Tamura | |
| 4,591,155 A | 5/1986 | Adachi | |
| 4,595,623 A * | 6/1986 | Du Pont et al. | 428/195.1 |
| 4,939,020 A | 7/1990 | Takashima et al. | |
| 5,152,856 A | 10/1992 | Thein et al. | |
| 5,174,934 A | 12/1992 | Saatchi | |
| 5,188,872 A | 2/1993 | Quigley | |
| 5,217,221 A | 6/1993 | Baum | |
| 5,230,947 A * | 7/1993 | Ou | 428/212 |
| 5,242,637 A | 9/1993 | Inoue et al. | |
| 5,407,195 A | 4/1995 | Tiitola et al. | |
| 5,496,027 A | 3/1996 | Christian et al. | |
| 5,587,231 A | 12/1996 | Mereer et al. | |
| 5,672,120 A * | 9/1997 | Ramirez et al. | 473/347 |
| 6,062,996 A * | 5/2000 | Quigley et al. | 473/563 |
| 6,573,309 B1 | 6/2003 | Reitenbach et al. | |
| 6,821,476 B2 | 11/2004 | McClelland | |
| 6,864,297 B2 | 3/2005 | Nutt et al. | |
| 6,918,847 B2 | 7/2005 | Gans et al. | |
| 7,008,338 B2 | 3/2006 | Pearson | |
| 7,044,870 B2 | 5/2006 | Pagotto | |
| 7,097,577 B2 | 8/2006 | Goldsmith et al. | |
| 7,125,352 B2 | 10/2006 | Gagnon et al. | |
| 7,144,343 B2 | 12/2006 | Goldsmith et al. | |
| 7,232,386 B2 | 6/2007 | Halko et al. | |
| 7,261,787 B2 | 8/2007 | Bellefleur et al. | |
| 7,326,136 B2 | 2/2008 | Jean et al. | |
| 7,329,195 B2 | 2/2008 | Pearson | |
| 7,863,381 B2 | 1/2011 | Nelson et al. | |
| 7,963,868 B2 * | 6/2011 | McGrath et al. | 473/563 |
| 2002/0025423 A1 | 2/2002 | Dreher et al. | |
| 2002/0187305 A1 * | 12/2002 | Czaplicki et al. | 428/143 |
| 2003/0119612 A1 | 6/2003 | Goldsmith | |
| 2003/0235675 A1 | 12/2003 | Wycech | |
| 2004/0041128 A1 | 3/2004 | Carter | |
| 2004/0150130 A1 | 8/2004 | Cundiff | |
| 2004/0197545 A1 | 10/2004 | Gehlsen | |
| 2004/0235592 A1 | 11/2004 | McGrath et al. | |
| 2005/0090339 A1 | 4/2005 | Gans | |
| 2005/0236736 A1 | 10/2005 | Formella | |
| 2006/0269738 A1 | 11/2006 | Kimberly | |
| 2006/0281592 A1 | 12/2006 | Goldsmith et al. | |
| 2009/0149283 A1 * | 6/2009 | Garcia | 473/563 |
| 2009/0149284 A1 * | 6/2009 | Garcia | 473/563 |

FOREIGN PATENT DOCUMENTS

| | | |
|---|---|---|
| GB | 2075412 | 11/1981 |
| GB | 2259667 | 3/1993 |
| GB | 2262315 | 6/1993 |

OTHER PUBLICATIONS

Expancel Microspheres, "Product Specification Expancel Du Dry Unexpanded Microspheres", Jun. 2007, <retrieved from http://www.expancel.com/ on Mar. 13, 2008>.
Ahmad, Maf, "Flexible Vinyul Resiliency Property Enhancement With Hollow Termoplastic Microspheres", Journal of Vinyl & Additive Technology, Sep. 2001, vol. 7, No. 3.
Webpages retrieved from http://www.expancel.com/. (2008).
European Search Report for EP08252256, dated Aug. 12, 2009.
European Search Report for Appl. No. EP08252257.4, dated Sep. 23, 2009.

* cited by examiner

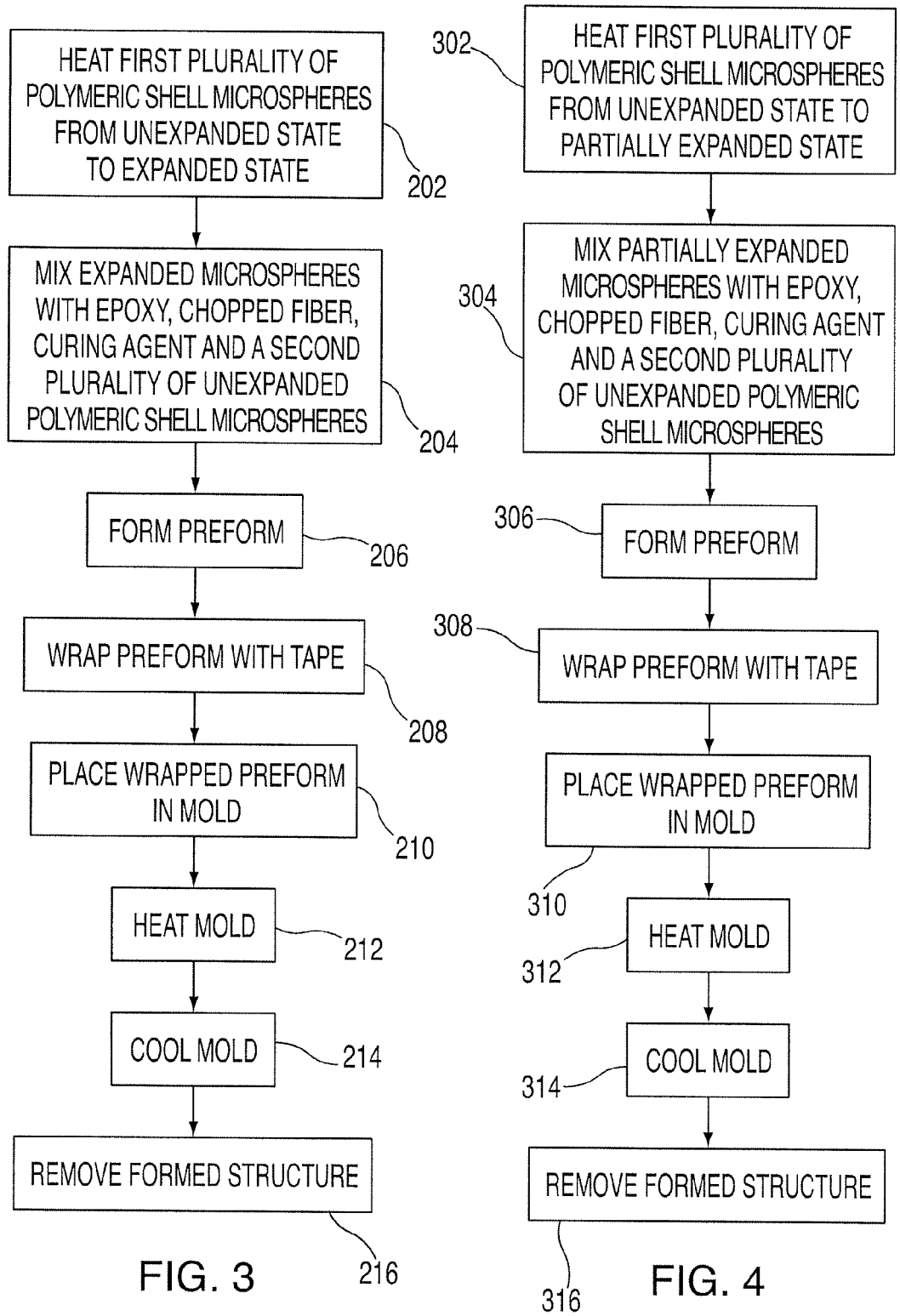

US 9,802,369 B2

EPOXY CORE WITH EXPANDABLE MICROSPHERES

FIELD OF THE INVENTION

This invention relates generally to fabrication of molded structures. More particularly, aspects of this invention relate to hockey blades molded from a core that includes expandable thermoplastic microspheres.

BACKGROUND

Typical hockey stick blades are generally made of a core reinforced with one or more layers of synthetic materials such as fiberglass, carbon fiber or Aramid. The core of the blade may also be made of a synthetic material reinforced with layers of fibers. The layers may be made of a woven filament fiber, preimpregnated with resin. Prior art structures have included a foam core with a piece of fiber on the front face of the blade and a second piece of fiber on the rear face of the blade, in the manner of pieces of bread in a sandwich.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this invention relate to systems and methods for fabricating a formed structure. In one aspect of the invention, a formed structure is fabricated with expandable polymeric shell microspheres. A first plurality of polymeric shell microspheres are heated from an unexpanded state to an expanded state to form a plurality of expanded microspheres. The expanded microspheres are mixed with a plurality of expanded microspheres with an epoxy resin and a second plurality of unexpanded polymeric shell microspheres to create a mixture. The mixture is formed in a shape such a hockey stick blade to create a preform. The preform is wrapped with fiber tape preimpregnated with resin to create a wrapped preform. The wrapped preform is placed in a mold. The mold is heated, expanding the second plurality of unexpanded microspheres from an unexpanded state to an expanded state. The mold is cooled and the formed structure is removed from the mold.

The preform comprises a first face surface, a second face surface, a first edge surface and a second edge surface, and the fiber tape extends continuously around the first face surface, the first edge surface, the second face surface and the second edge surface. The mixture further comprises a chopped fiber and a curing agent.

In another aspect of the invention, a first plurality of polymeric shell microspheres are heated from an unexpanded state to a partially expanded state to form a plurality of expanded microspheres. The partially expanded microspheres are mixed with a plurality of expanded microspheres with an epoxy resin and a second plurality of unexpanded polymeric shell microspheres to create a mixture. The mixture is formed in a shape such a hockey stick blade to create a preform. The preform is wrapped with fiber tape preimpregnated with resin to create a wrapped preform. The wrapped preform is placed in a mold. The mold is heated, expanding the first plurality of partially expanded microspheres and the second plurality of unexpanded microspheres from an unexpanded state to an expanded state. The mold is cooled and the formed structure is removed from the mold.

The preform comprises a first face surface, a second face surface, a first edge surface and a second edge surface, the tape extending continuously around the first face surface, the first edge surface, the second face surface and the second edge surface. The mixture further comprises chopped fiber and a curing agent.

Another aspect of the invention is an expandable core comprising epoxy, a curing agent, gas encapsulated polymeric shell microspheres expanded by heating to a diameter of about 40-50 microns, and unexpanded, expandable gas encapsulated polymeric shell microspheres about 10-12 microns in diameter. The core further includes chopped fiber.

Other objects and features of the invention will become apparent by reference to the following description and drawings.

BRIEF DESCRIPTION OF THE DRAWINGS

A more complete understanding of the present invention and certain advantages thereof may be acquired by referring to the following detailed description in consideration with the accompanying drawings, in which:

FIG. 3 is a flow diagram illustrating steps of a process to fabricate a blade in accordance with an exemplary embodiment;

FIG. 4 is a flow diagram illustrating steps of a process to fabricate a blade in accordance with another exemplary embodiment.

The reader is advised that the attached drawings are not necessarily drawn to scale.

DETAILED DESCRIPTION

In the following description of various example structures in accordance with the invention, reference is made to the accompanying drawings, which form a part hereof, and in which are shown by way of illustration various structures in accordance with the invention. Additionally, it is to be understood that other specific arrangements of parts and structures may be utilized, and structural and functional modifications may be made without departing from the scope of the present invention. Also, while the terms "top" and "bottom" and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention.

In general, as described above, aspects of this invention relate to systems and methods for fabricating a structure, such as a hockey stick blade. More detailed descriptions of aspects of this invention follow.

Figure 1:
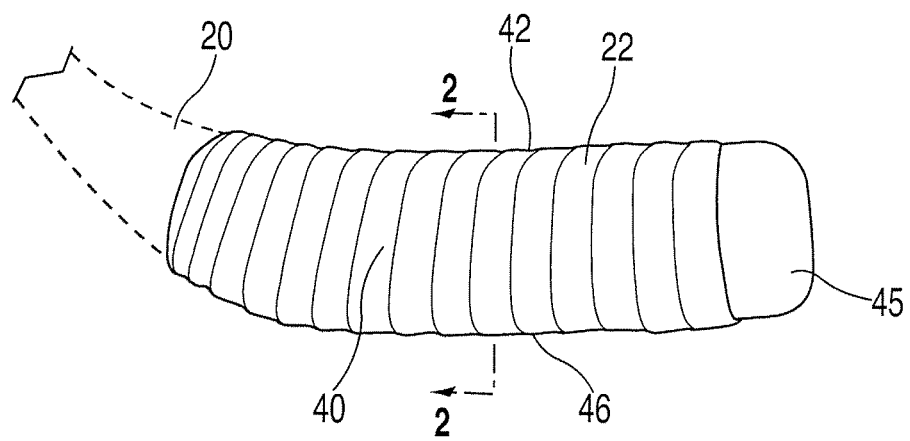
FIG. 1 generally illustrates an isometric side view of a core formed in the shape of a blade and wrapped with tape.
Figure 2:
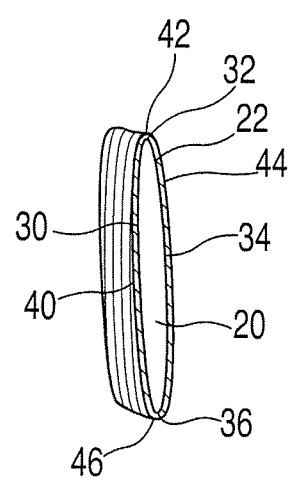
FIG. 2 is an isometric side view of the core with a cross sectional view taken along line 2-2 of FIG. 1.

FIG. 1 illustrates a side view of an epoxy core 20 formed in the shape of a blade and wrapped with tape 22. FIG. 2 is a cross sectional view taken along line 2-2 of FIG. 1, which shows the tape 22 wrapped continuously around the core 20.

The epoxy core 20 is formed with microspheres. In one embodiment, "Expancell" microspheres are used. In the formation of these microspheres, a drop of a hydrocarbon, liquid isobutene, is encapsulated in a gasproof, polymeric thermoplastic shell. When this microsphere is exposed to heat, the shell softens and the hydrocarbon inside the shell increases its pressure, expanding the shell. Before expansion, the diameter of the microsphere is typically 10-12 um and the density is 1000-1200 kg/m3. After expansion, the diameter of the microsphere is 40-50 um and the density decreases to 20-30 kg/m3.

The temperature at which expansion starts as well as the temperature at which the maximum expansion and the lowest density is obtained depends on a variety of factors including the rate of heating of the shells. At temperatures above the temperature at which the highest expansion is obtained the microspheres gradually collapse.

The microspheres are highly resilient. The expanded microspheres are easy to compress. Due to this resiliency, the microspheres can withstand cycles of loading/unloading without collapsing or breaking. This property is important for use in shock absorbent materials.

Thermoplastic microspheres are distinct from glass microballoons. Glass microballoons are heavier than thermoplastic microballoons. Additionally, glass microballoons do not exhibit the same dampening properties as thermoplastic microballoons. For these reasons, thermoplastic microspheres are preferred over glass microballoons in the manufacture of hockey stick blade, which must be lightweight, flexible and capable of withstanding considerable forces.

As a first step in one embodiment of the process, a group of expandable microspheres are heated and they expand from their original size to an expanded size. The expanded microspheres have a diameter of 60-120 um.

The expanded microspheres are then mixed with unexpanded microspheres. This combination of expanded and unexpanded microspheres is mixed with an epoxy material, such as Epon828. Other strengthening materials, such as aramid pulp, chopped fiber glass or chopped carbon fiber are also added to the mixture. Carbon nanotubes can also be added enhance stiffness and shear strength. A curing agent is also added to the mixture. The final epoxy mixture has the consistency of modeling clay.

The mixture of the expanded microspheres, the unexpanded microspheres, the epoxy, the other strengthening materials and the curing agent is then formed in the shape of a preform, such as a hockey blade. As shown in FIG. 2, the preform has a first face surface 30, a first edge 32, a second face surface 34, and a second edge 36.

The structure is then wrapped with carbon fiber tape 22. The carbon fiber tape 22 is preimpregnated with resin. The tape 22 is wrapped continuously around the first face surface 30, the first edge 32, the second face surface 34 and the second edge 36. This continuous wrapping of the preform 20 with the tape 22 results in a first wrapped face 40, a second wrapped face 44, a top wrapped edge 42 and a bottom wrapped edge 46.

Figure 5:
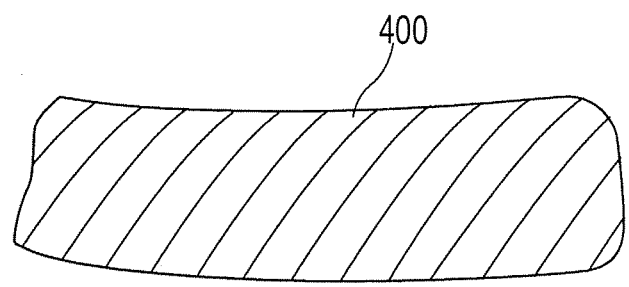
FIG. 5 is an isometric side view of a core formed in the shape of a blade and wrapped with tape in a configuration different than that of FIG. 1.
Figure 6:
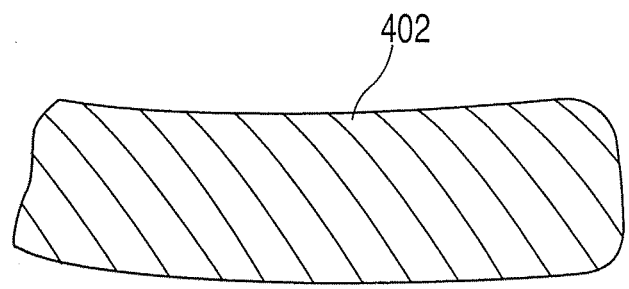
FIG. 6 is an isometric side view of a core formed in the shape of a blade and wrapped with tape in a configuration different than that of FIG. 1 and FIG. 5.

The tape may be wrapped in various configurations around the core, such as shown in FIG. 5 and FIG. 6. The tape may be wrapped at a 30 or 45 degree angle to the longitudinal axis of the blade, as shown in FIG. 5. A second layer of preimpregnated may be wrapped at a 90 degree angle to the tape, as shown in FIG. 6.

As shown in FIG. 1, the core includes a toe 45. The tape 22 extends around the entire core, to the end of the toe 45, but for purposes of more clearly illustrating the invention in FIG. 1, the tape 22 is not shown extending to the end of the toe 45 of the core.

The use of tape wrapped continuously around the entire epoxy preform core, including the edges, is advantageous over a sandwich configuration, where the tape does not continuously extend of over the edges, for several reasons. A hockey blade must be very durable and capable of withstanding large forces from a variety of directions. For example, the hockey blade can encounter considerable forces, such as from striking a puck or the surface of the ice in multiple manners and angles. Thus, the core needs reinforcement in all directions. The wrap configuration results in a torsionally stiffer and stronger structure. The wrap configuration also is better able to withstand shear forces.

The wrapped structure is then placed in a mold. The mold is heated to an appropriate temperature. In one embodiment, the mold is heated to 140 degrees C. Upon heating, the epoxy softens. Additionally, the unexpanded microspheres expand with this additional hearing. The epoxy, microspheres, the other materials bond to each other and also bond to the carbon fiber tape in the mold.

The mold is cooled and the formed blade is removed from the mold.

The unexpanded microspheres are required to produce enough pressure on the outer walls of the structure. Without sufficient pressure during the molding process, the walls will be wrinkled and/or have large numbers of voids and/or other imperfections.

The expanded microspheres increase the viscosity of the material, making a more stable pre-form during the kitting operation. Also, the expanded microspheres allow for a larger volume pre-form, which is closer to the final geometry of the part. This is advantageous because it allows less movement (and more precision) of the structural fibers during the molding process.

The combination of expanded and unexpanded (or partially expanded) is important because it provides a high viscosity material which produces enough pressure to compress/consolidate the carbon fibers walls around it.

In one embodiment, the core comprises the following materials (parts/weight):
Base epoxy (Epon 828): 100
Chopped fiber, e.g., Aramid Pulp 3091 (from Teijin): 2.5
Hardener (curing agent): 14.82
Expancel (pre-expanded) 092DET80d20: 2
Expancel (unexpanded) 051DU40: 2.5

The steps of this embodiment of the process are illustrated in FIG. 3. As shown at 202, a first plurality of polymeric shell microspheres are heated from an unexpanded state to an expanded state to form a plurality of expanded microspheres. As shown at 204, the plurality of expanded microspheres are mixed with an epoxy resin, chopped fiber, curing agent and a second plurality of unexpanded polymeric shell microspheres to create a mixture. The mixture is formed in a shape to create a preform, such as a hockey blade, as shown at 206. The preform is wrapped with fiber tape to create a wrapped preform as shown at 208. The preform comprises a first face surface, a second face surface, a first edge surface and a second edge surface, and the fiber tape extends continuously around the first face surface, the first edge surface, the second face surface and the second edge surface. The wrapped preform is placed in a mold as shown at 210. The mold is heated and the second plurality of unexpanded microspheres expand from an unexpanded state to an expanded state as shown at 212. The mold is cooled as shown at 214, and the formed structure is removed from the mold as shown at 216.

As a first step in another embodiment of the process, a group of expandable microspheres are heated and they partially expand from their original size to a larger size, but not to their full size. The partially expanded microspheres have a diameter of 60-90 um.

The partially expanded microspheres are then mixed with unexpanded microspheres. This combination of partially expanded and unexpanded microspheres is mixed with an epoxy material, such as Epon828. Other strengthening materials, such as aramid pulp, chopped fiber glass or chopped carbon fiber are also added to the mixture. Carbon nanotubes can also be added enhance stiffness and shear strength. A curing agent is also added to the mixture. The final epoxy mixture has the consistency of modeling clay.

The mixture of the partially expanded microspheres, the unexpanded microspheres, the epoxy, the other strengthening materials and the curing agent is then formed in the shape of a preform, such as a hockey blade. As shown in FIG. 2, the preform has a first face surface 30, a first edge 32, a second face surface 34, and a second edge 36.

The structure is then wrapped with carbon fiber tape 22. The carbon fiber tape is preimpregnated with resin. The tape is wrapped continuously around the first face surface 30, the first edge 32, the second face surface 34 and the second edge 36. This continuous wrapping of the preform 20 with the tape 22 results in a first wrapped face 40, a second wrapped face 44, a top wrapped edge 42 and a bottom wrapped edge 46.

The use of tape wrapped continuously around the entire epoxy preform core, including the edges, is advantageous over a sandwich configuration, where the tape does not continuously extend of over the edges, for several reasons. A hockey blade must very durable and capable of withstanding large forces from a variety of directions. For example, the hockey blade can encounter considerable forces, such as from striking a puck or the surface of the ice in a multiple manners and angles. Thus, the core needs reinforcement in all directions. The wrap configuration results in a torsionally stiffer and stronger structure. The wrap configuration also is better able to withstand shear forces.

It is to be understood that the tape need not consist of a single unitary piece or sheet of material. For example, the tape can consist of a combination of multiple pieces or sheets that overlap.

The wrapped structure is then placed in a mold. The mold is heated to an appropriate temperature. In one embodiment, the mold is heated to 140 degrees C. Upon heating, the epoxy softens. Additionally, the unexpanded microspheres, as well as the microspheres that previously were partially expanded, expand further with this additional hearing. The epoxy, microspheres, the other materials bond to each other and also bond to the carbon fiber tape in the mold.

The mold is cooled and the formed blade is removed from the mold.

The steps of this embodiment of the process are illustrated in FIG. 4. As shown at 302, a first plurality of polymeric shell microspheres are heated from an unexpanded state to a partially expanded state to form a plurality of expanded microspheres. As shown at 304, the plurality of expanded microspheres are mixed with an epoxy resin, chopped fiber, curing agent and a second plurality of unexpanded polymeric shell microspheres to create a mixture. The mixture is formed in a shape to create a preform, such as a hockey blade, as shown at 306. The preform is wrapped with fiber tape to create a wrapped preform as shown at 308. The preform comprises a first face surface, a second face surface, a first edge surface and a second edge surface, and the fiber tape extends continuously around the first face surface, the first edge surface, the second face surface and the second edge surface. The wrapped preform is placed in a mold as shown at 310. As shown at 312, the mold is heated, and the first plurality of partially expanded microspheres expand to an expanded state, and the second plurality of unexpanded microspheres expand from an unexpanded state to an expanded state. The mold is cooled as shown at 314, and the formed structure is removed from the mold as shown at 316.

In alternative embodiment, different combinations of core materials are used to create distinct recipes of core mixtures. The different mixtures can be used to create a blade with zones of varying density and stiffness. The bottom of the blade and the heel of the blade are typically subject to the most force and impact from striking the ice or a hockey puck. Core mixtures with higher density materials can be placed in the areas of the blade subject to greater forces and impacts, such as the bottom or heel, to create stronger blade regions.

In an alternative embodiment, the core is formed with the epoxy, microspheres and other materials as described, and additionally with a foam insert. The foam insert may be a polymethacrylimide (PMI) foam such as manufactured under the name Rohacell. A suitable low density PMI foam is RIMA (Resin Infusion Manufacturing Aid) foam. This type of foam is a high strength foam that can withstand the shear and impact forces that result when a hockey blade strikes a hockey puck. The foam is placed on various locations of the blade to create a blade with zones of varying density. The foam may be placed along the top or the toe of the blade to reduce weight.

The reader should understand that these specific examples are set forth merely to illustrate examples of the invention, and they should not be construed as limiting the invention. Many variations in the connection system may be made from the specific structures described above without departing from this invention.

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

We claim:

1. A composite article comprising a foam core wrapped with a tape for use as a hockey blade of a hockey stick, the article fabricated by the following steps:

heating a first plurality of unexpanded thermoplastic microspheres from an unexpanded state to a partially expanded state to create a plurality of partially expanded microspheres;

mixing the plurality of partially expanded microspheres with an epoxy resin, aramid pulp, and a second plurality of unexpanded thermoplastic microspheres to create an epoxy mixture;

forming the mixture to create a bottom and heel section of the hockey blade and placing a foam having a lower density than the mixture along a top or a toe to form the top or toe sections of the hockey blade thereby creating a preform for the hockey blade;

wrapping the preform with fiber tape to create a wrapped preform;

placing the wrapped preform in a mold;

wherein the plurality of partially expanded microspheres and the second plurality of unexpanded microspheres are configured to be expanded during a heating process to compress the fiber tape, and to bond to the epoxy resin and the foam; and wherein the epoxy mixture is a viscous material such that it provides enough pressure to compress and consolidate the fiber tape.

2. The article according to claim 1 wherein the mixture further comprises fiber tape preimpregnated with resin.

3. The article according to claim 2 wherein the preform comprises a first face surface, a second face surface, a first edge surface and a second edge surface, the tape extending continuously around the first face surface, the first edge surface, the second face surface and the second edge surface.

4. The article according to claim 3 wherein the mixture further comprises chopped fiber and a curing agent.

5. The article according to claim 1 wherein the epoxy mixture further comprises 2 parts/weight of pre-expanded microspheres and 2.5 parts/weight of unexpanded microspheres.

6. The composite article according to claim 1, wherein the epoxy mixture has the consistency of modeling clay.

7. The composite article of claim 1 wherein the polymeric shell microspheres are expanded to about 3 to 5 times their original size.

8. The composite article of claim 1 wherein the polymeric shell microspheres are expanded by heating to a diameter of about 40-50 microns.

* * * * *